INVENTOR.
GEORGE C. McNABB
BY David E. Hopper
ATTORNEY

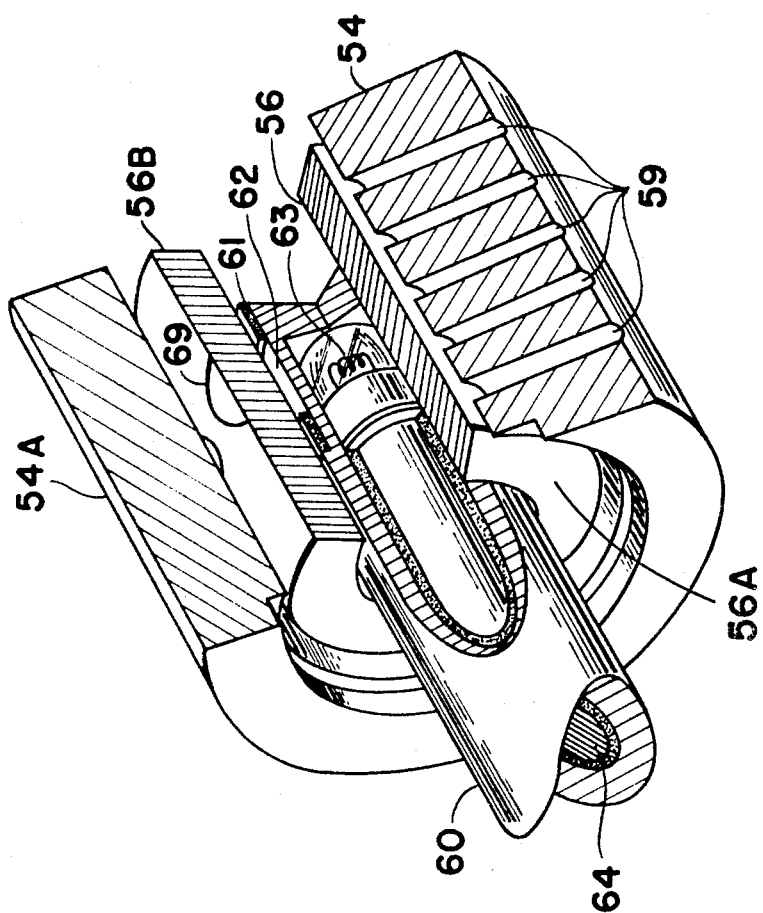

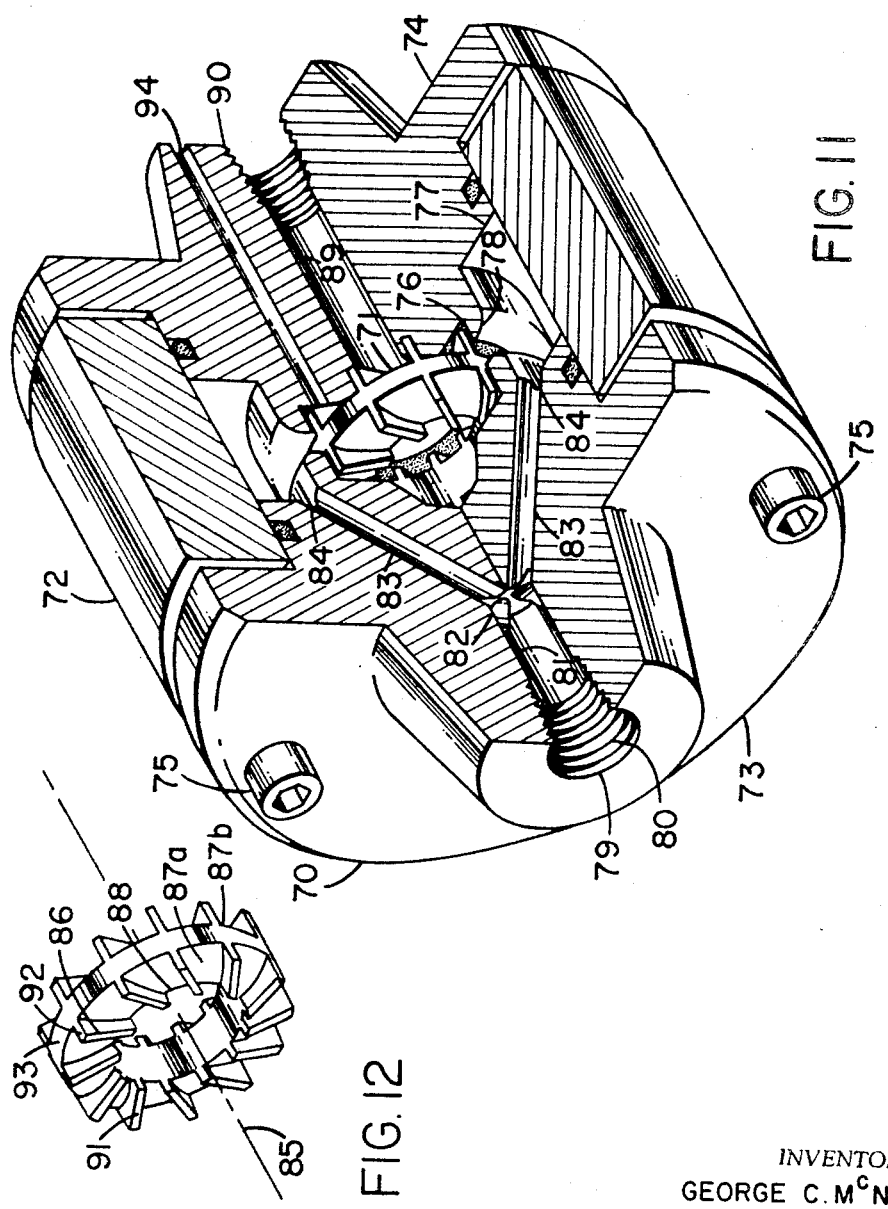

United States Patent Office 3,447,373
Patented June 3, 1969

3,447,373
BEARINGLESS FLOWMETER EMPLOYING FLUID SUPPORT FOR ROTOR
George C. McNabb, Attleboro, Mass., assignor to The Foxboro Company, Foxboro, Mass., a corporation of Massachusetts
Filed Sept. 27, 1966, Ser. No. 587,366
Int. Cl. G01f 1/06
U.S. Cl. 73—229                                   34 Claims

ABSTRACT OF THE DISCLOSURE

A flowmeter has a cylindrically shaped chamber through which fluid is made to flow so that it progresses radially therethrough; a rotor is located within the chamber having a shape generally conformable to the chamber but being somewhat smaller; a radial progression of fluid tends to center the axis of rotation of the rotor at the chamber center, so that the periphery of the rotor is separated at all points from the chamber walls, permitting rotation without any physical contact between rotor and chamber; in some versions the radial flow spirals through the chamber to thereby impart rotation to the rotor; in other versions the radial flow may be more direct, with vanes on the rotor imparting rotation to the rotor; various output devices may be employed therewith for detecting the frequency of rotation of the rotor, which frequency is indicative of fluid flow rate.

---

Figure 1:
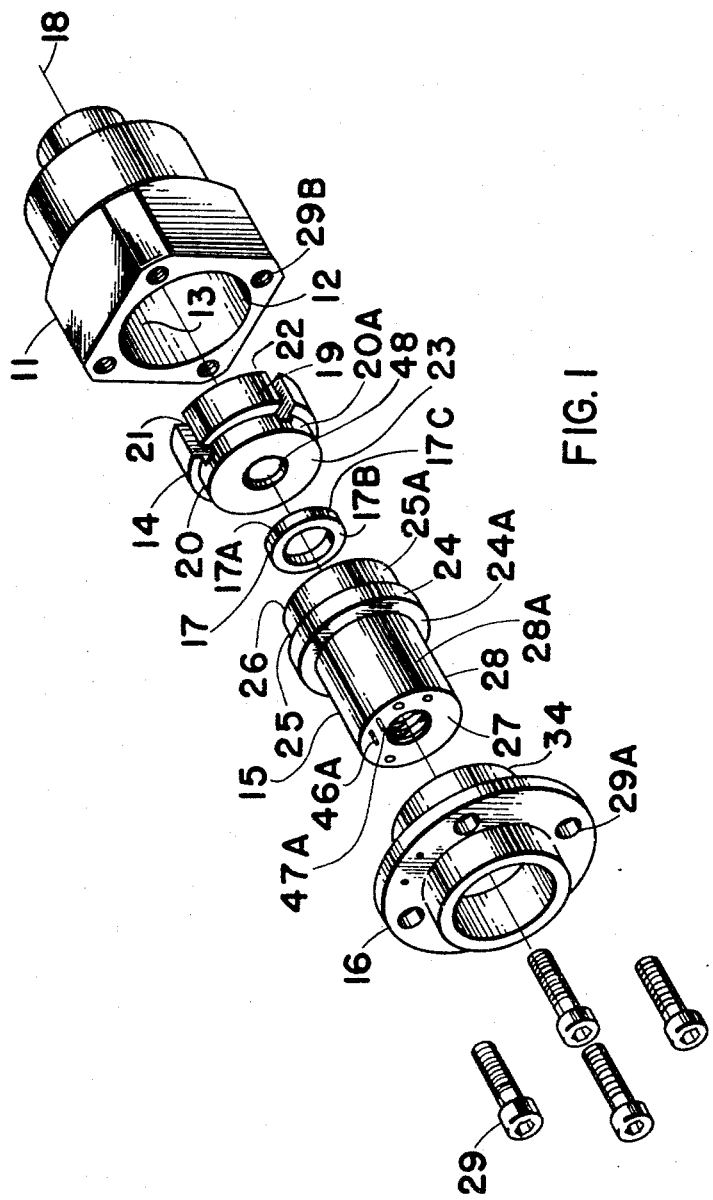

This invention relates to flowmeters generally, and more particularly, to flowmeters employing a mechanical rotating element.

There exist many types of devices for measuring fluid flow. Generally, there are head meters, velocity meters, force meters, and positive displacement meters. Each type of flowmeter has application in a particular flow environment. Considerations are made of flow contamination, corrosion, required flow range, allowed meter pressure drop, flowmeter expense, required linearity and accuracy, and expected maintenance-free life to determine the particular flowmeter suitable. Flowmeters employing a moving mechanical element such as a rotor responsive to flow rate are used in many applications, these meters generally being adaptable to the required accuracy, and offering the advantages of a pulse output having a frequency related to flow rate. Limitations upon this type of meter arise from the use of a mechanical bearing for maintaining the required attitude of the moving element. Characteristics of the mechanical bearing determine a maximum flow rate, meter rangeability, and acceptable levels of contamination in the flow. The finite friction loss in the mechanical bearing is a source of error in the flow reading over the meter range, and this friction also determines the lowest measurable flow rate. Overranging a flowmeter for a short time will ruin many types of flowmeter bearings. In short, the mechanical bearing in a flowmeter is a major source of design problems.

To remedy difficulties inherent in the use of a mechanical bearing in a flowmeter, the present invention proposes instead suspension of the rotatable member by means of the measured fluid itself, without the use of any mechanical bearing. The rotatable member in the flowmeter of the present invention is generally separated by the fluid from any mechanical contact with other parts of the flowmeter during flowmeter operation. Fluid suspension of the moving element offers many advantages arising from the elimination of a mechanical bearing.

Accordingly, it is an object of this invention to provide a fluid suspension for a rotating element in a flowmeter.

It is another object of this invention to provide a flowmeter relatively unaffected by contaminants in the fluid.

It is another object of this invention to provide a flowmeter not susceptible to bearing deterioration as a result of over-speeding of its rotating element.

It is another object of this invention to provide a flowmeter with a rotatable member having a speed generally proportional to the rate of flow, the member being suspended free from mechanical contact with the flowmeter by fluid being measured.

It is another object of this invention to provide a flowmeter having a rotatable mechanical element responsive to flow and constrained in its plane and axis of rotation by the operation of forces generated by fluid flow through the flowmeter.

It is another object of this invention to provide a simple, efficient and accurate flowmeter not susceptible to errors arising from energy losses associated with mechanical bearings.

It is another object of this invention to provide a flowmeter having a mechanical element therein responsive to flow rate with a sufficient clearance from the flowmeter interior to permit a wide variation of particle-bearing fluids to be measured.

It is another object of this invention to provide a flowmeter whose components may be made of materials resistant to the effects of corrosive fluids.

It is another object of this invention to provide readout means for measuring the speed of a moving element in a flowmeter having no appreciable influence on flowmeter operation.

It is another object of this invention to provide digital type read-out means in connection with a rotatable element in a flowmeter.

It is another object of this invention to provide a means of fluid suspension for a rotating element responsive to flow rate through a flowmeter whereby the liquid or gas fluid being measured provides the support for the rotating element.

It is another object of this invention to provide a flowmeter capable of measuring extremely low flow rates of liquids or gas.

Figure 2:
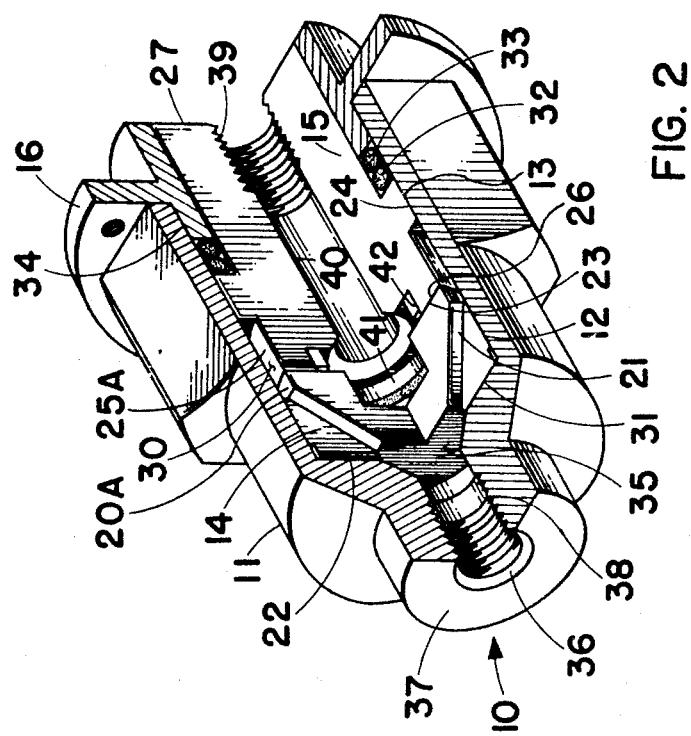
Figure 3:
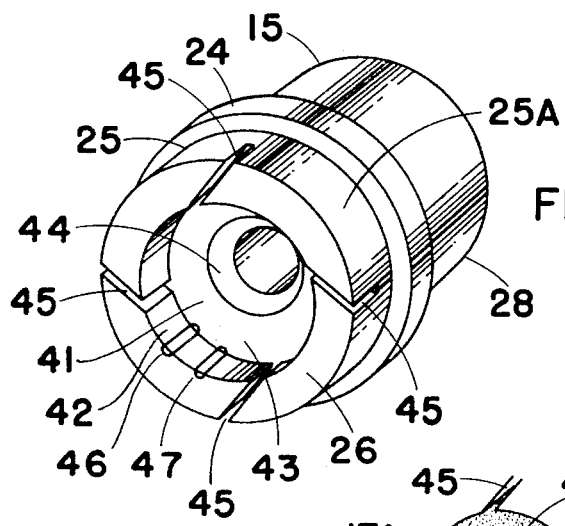
Figure 4:
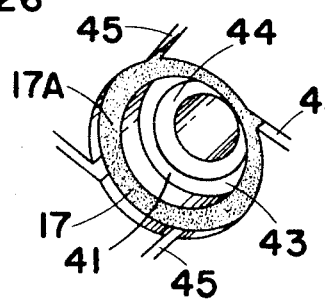
Figure 5:
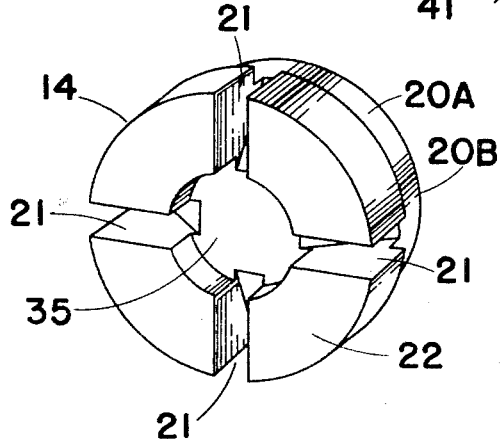
Figure 6:
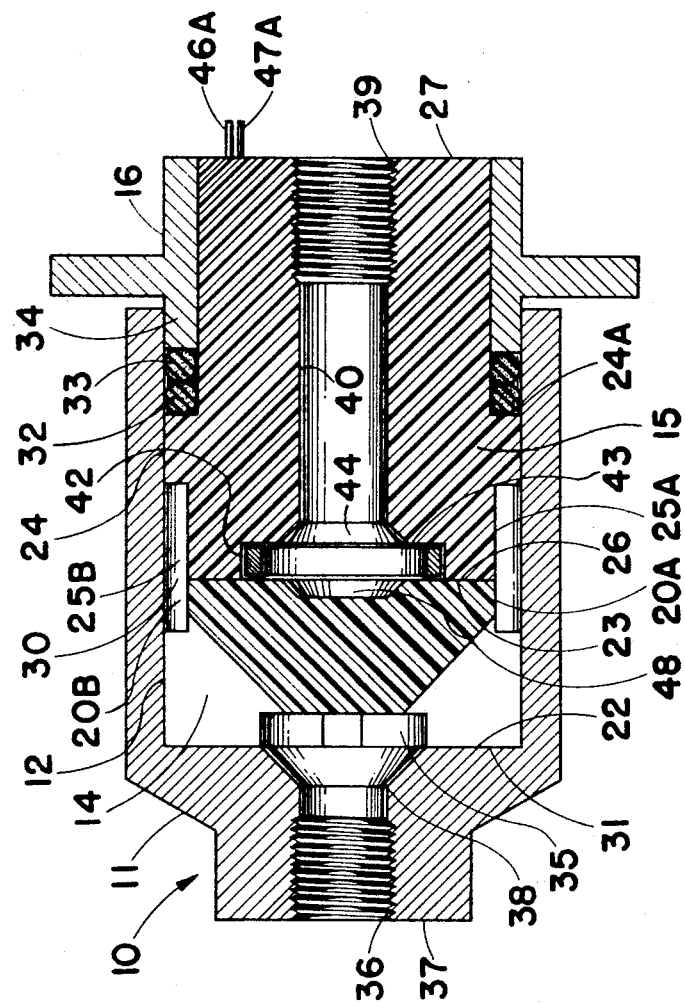
Figure 7:
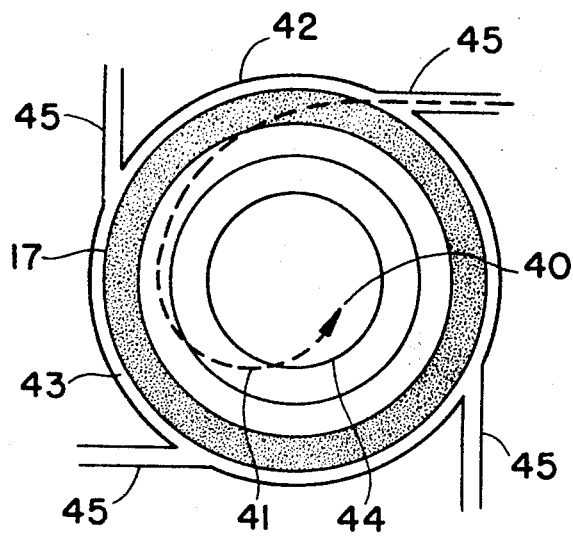
Figure 8:
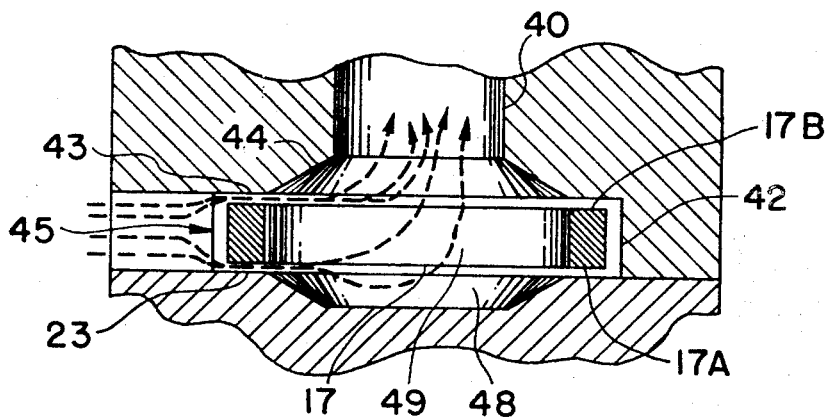
Figure 9:
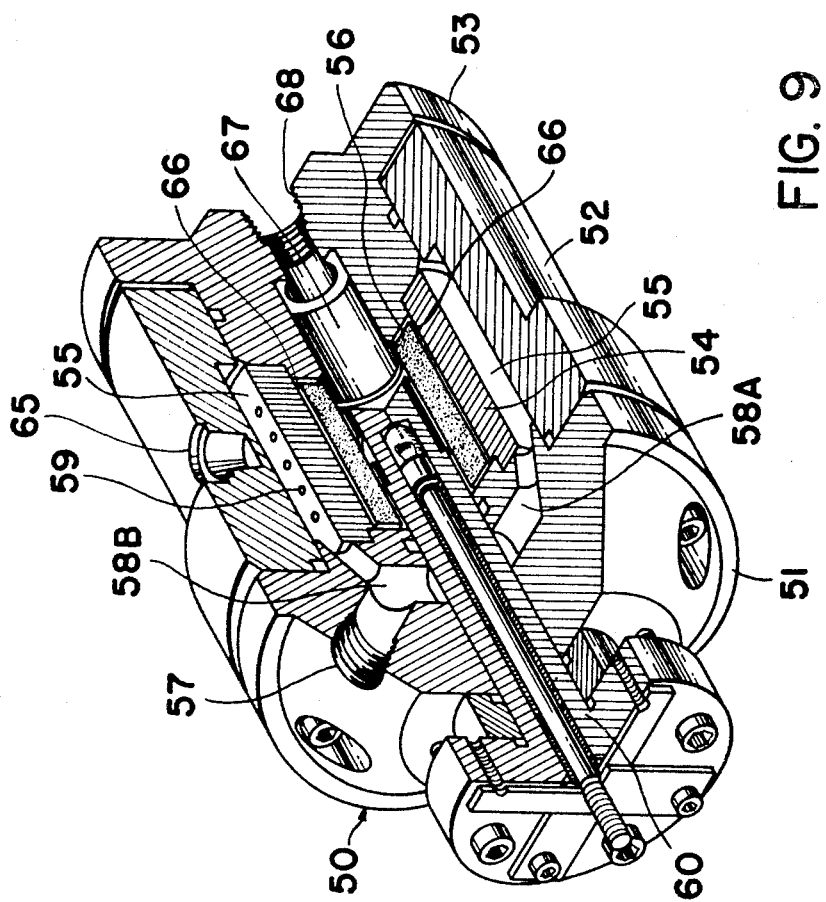
Figure 13:
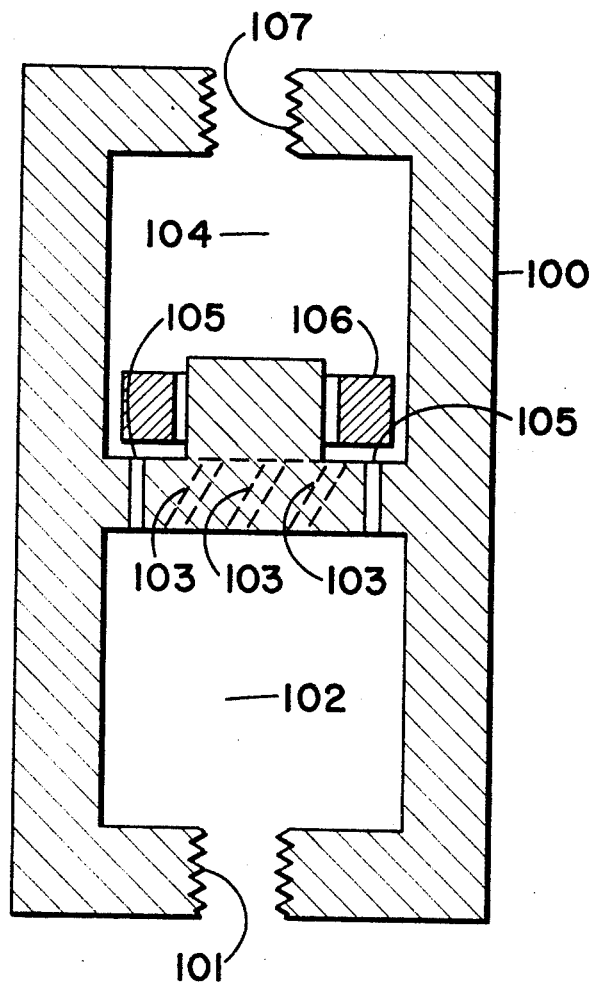

Other objects and advantages of this invention will be in part apparent from the detailed description hereof and in part from the drawings, in which:

FIGURE 1 is a three-dimensional exploded view of the main components of a first embodiment of the invention, FIGURE 2 is a three-dimensional view of the first embodiment with a quarter-section cut away, FIGURE 3 is a three-dimensional view of the first embodiment jet support, FIGURE 4 is a three-dimensional view of the first embodiment wheel shown in relationship to the wheel chamber formed by proximate parts of the jet support, FIGURE 5 is a three-dimensional view of the first embodiment flowmeter distributor, FIGURE 6 is a cross-sectional view along the axis of symmetry of the first embodiment, FIGURE 7 is a schematic cross-section of a wheel chamber normal to a flowmeter axis or symmetry showing the relationship of the wheel thereto, FIGURE 8 is a schematic cross-section of a wheel chamber along a flowmeter axis of symmetry, FIGURE 9 is a three-dimensional view of another flowmeter embodiment adapted for gaseous fluids shown with a quarter section cut away, FIGURE 10 is a sectional three-dimension view of the wheel chamber and adjacent components of the flowmeter embodiment of FIGURE 9, FIGURE 11 is a three-dimensional quarter-sectioned view of a flowmeter embodiment of the invention adapted for substantially radial fluid flow through the wheel chamber, FIGURE 12 is a three-dimensional view of the flowmeter wheel of FIGURE 11, FIGURE 13 is a schematic cross-section of an embodiment in which the rotating member is supported by an upwardly-directed fluid flow.

Referring now to FIGURE 1, a flowmeter embodying the invention is shown with a three-dimensional exploded view of its major components. Housing 11 of the flowmeter has a recess 12 therein, recess 12 having cylindrical wall 13. Thereby, housing 11 has a generally cup-shaped configuration. Distributor 14 and jet support 15 are adapted for snug fitting within recess 12, both being clamped therein by retainer 16. Wheel 17 is located within a chamber formed by abutment of proximate parts of distributor 14 and jet support 15. The flowmeter components have shapes generally symmetrical about axis 18 through the flowmeter.

Distributor 14 has a generally cylindrical periphery 19 having a diameter adapted to fit snugly within cylindrical wall 13 of recess 12. Distributor 14 has a cylindrical section 20 with a smaller diameter than cylindrical periphery 19. Accordingly, an annular space exists between peripheral surface 20a of section 20 and cylindrical wall 13 of recess 12 when distributor 14 is in place. Distributor 14 has a plurality of flow distribution channels 21 connecting the area at face 22 of distributor 14 to the area proximate to peripheral surface 20a of section 20. Face 23 of distributor 14 bounds cylindrical section 20 on the side of distributor 14 opposite face 22.

Jet support 15 has a generally cylindrical shape with a cylindrical section 24 thereof having a diameter adapted to fit snugly with cylindrical wall 13 of recess 12. Jet support 15 has a cylindrical section 25 located between section 24 and jet support inner face 26 having a smaller diameter than section 24 thereby providing an annular space between peripheral surface 25a of section 25 and cylindrical wall 13 of recess 12. The radial dimensions of this space with respect to axis 18 is approximately the same as the aforementioned space between peripheral surface 20a of section 20 and wall 13.

Jet support 15 has a section 28 located between section 24 and jet support outer face 27 having a diameter less than section 24 thereby providing an annular space between periphery 28a of section 28 and cylindrical wall 13 of recess 12. Retainer 16 fits snugly around cylindrical section 28 of jet support 15, and annular extension 34 of retainer 16 extends into the clearance between periphery 28a and wall 13. Retainer 16 clamps the components of the flowmeter assembly together by exerting pressure through O-rings against face 24a of section 24 of jet support 15, thereby compressing jet support 15 and face 26 thereof against face 23 of distributor 14; face 22 of distributor 14 is thereby held against the inside end 31 of recess 12. Bolts 29 are fitted through apertures 29a in retainer 16 threaded into seats 29b in housing 11 to provide a means of permanently mounting the entire assembly together.

In this relationship of the major components, it should be noted that peripheral surface 20a of section 20 of distributor 14 abuts peripheral surface 25a of section 25 of jet support 15, forming a continuum of surfaces 20a and 25a. Thereby, the annular spaces between peripheral surfaces 20a and 25a and wall 13 are contiguous. These contiguous spaces taken as a single area may be referred to as plenum chamber 30. Plenum chamber 30 may be seen in FIGURES 2 and 6.

Referring now to FIGURE 2, a quarter-sectioned view of flowmeter 10 assembly is shown, the cut-away being a 90° section having its origin along axis 18. Housing 11 contains cylindrical recess 12 terminating in recess face 31 therein. Face 22 of distributor 14 is in contact with recess face 31. Face 23 of distributor 14 is in contact with inner face 26 of jet support 15. Section 24 of jet support 15 is shown fitting snugly against wall 13 of cylindrical recess 12. O-rings 32 and 33 are compressed against face 24a of section 24 by an annular extension 34 of retainer 16. Retainer 16 is mounted to the body of housing 11 by means of bolts 29.

The volume bounded by the contiguous peripheral surfaces 20a and 25a on one side, and by an outwardly concentric portion of wall 13 on the other, form annular plenum chamber 30. Flow distributor channels 21 lead into plenum chamber 30, connecting distributor well 35 thereto.

Flow inlet 36 opens through end 37 of housing 11 into flow inlet channel 38 connecting into distributor well 35. The flow outlet 39 opens through outer face 27 of jet support 15, leading from flow outlet channel 40 connecting with wheel chamber 41.

Referring now to FIGURE 3, a detailed three-dimensional view of jet support 15 is shown. Cylindrical section 24 of jet support 15 has a diameter adapted to fit snugly with cylindrical wall 13 of recess 12 when jet support 15 is mounted within housing 11. Cylindrical section 28 has a smaller diameter than section 24, thereby providing an annular space between section 28 and inner wall 13 of recess 12 for mounting O-rings 32 and 33 and insertion of annular extension 34 of retainer 16 in said space as referred to above.

Cylindrical section 25 of jet support 15 extends from section 24 and terminates in inner face 26 of jet support 15. Section 25 has a diameter providing an annular space between wall 13 of recess 12 and peripheral surface 25a, this space being a portion of plenum chamber 30 as referred to above. Wheel chamber 41 is a recess within jet support 15 cut into inner face 26, wheel chamber 41 being bounded by chamber face 43 within jet support 15. Wheel chamber 41 has a cylindrical periphery 42 concentric with axis 18. Wheel chamber flow outlet 44 connects wheel chamber 41 to flow outlet channel 40, which is concentric with axis 18.

Jets 45 are cut between peripheral surface 25a and cylindrical periphery 42 of wheel chamber 41 through section 25. Each jet is cut to make an angle with that radius of wheel chamber 41 passing therethrough. Illustratively, there are four equally spaced jets 45 cut through section 25, although one or more jets may be employed according to the application. In general, a larger number of jets tends to yield a lowered pressure drop through the flowmeter while a smaller number of jets tends to increase the velocity of fluid entering therethrough into wheel chamber 41, all other things being equal.

In the embodiment illustrated, jets 45 may conveniently have a size determined by a straight cut through section 25 measuring approximately .015 inch wide and extending a convenient depth into section 25. Other cut sizes may be used as determined by design criteria such as fluid velocities and fluid pressure drops suitable for the requisite range of flows. Jets 45 are shown cut through a portion of section 25; narrower or broader jet depths may be employed. The width of jets 45 is limited by the necessity for a partition between adjacent jets. In the extreme case of narrow partitions between the jets, the partitions would appear as blades or vanes and the pressure drop between plenum chamber 30 and wheel chamber 41 would be relatively low. The velocity of the fluid entering wheel chamber 41 would tend to be reduced in this case as compared with narrow jets 45.

Varying angles of jets 45 with the respective radius of wheel chamber 41 intersecting the entrance of jet 45 through chamber periphery 42 may be employed. All the jets 45 may have similar angles, or variations in angles may be used. In any case, changing the angle of jets 45 affects the characteristics of flowmeter 10.

Readout sensors 46 and 47 are shown imbedded in periphery 42 of wheel chamber 41. Sensors 46 and 47 are electrically connected to terminals 46a and 47a shown in FIGURE 1.

In FIGURE 4, wheel 17 is shown located within wheel chamber 41, illustratively having a ring-shaped structure with a rectangular cross-section, and being located in an operating position concentric with the periphery 42 of wheel chamber 41. The outside diameter of wheel 17 is selected to provide a suitable spacing with periphery 42 of wheel chamber 41.

Wheel configurations are feasible other than wheels having the rectangular cross section shown. For instance, a wheel having a circular or streamlined cross-section may be employed. Meter characteristics may be changed by employing different shaped wheels in conjunction with an appropriate wheel chamber configuration. In the case of wheel shapes other than the rectangular cross-section, fluid forces normal to the radial plane of the wheel may be impressed over an effective face encompassing most or all of the wheel surface while radial forces may act over a part of the wheel also having axial forces impressed thereon. Thus, a point on the wheel may have a pressure thereon with both axial and radial vectors.

So, too, the wheel chamber may have other cross-sectioned shapes than the rectangular shape shown. For instance, an oval shape appropriate to a wheel having a circular or streamlined cross-section may be used, wherein the spacing between wheel and chamber walls is more or less uniform along the outer radial half of the wheel cross-section. Such alternative wheel and chamber shapes will yield different parameters of flowmeter performance.

Referring to FIGURE 5, distributor 14 is shown in a three-dimensional view with face 22 in full view, face 22 being adapted to fit against recess face 31 of housing 11. Flow channels 21 are adapted to direct flow entering through inlet 36 of housing 11 and arriving in the region of distributor well 35 throught channels 21 to the area 20b adjacent circumferential periphery 20a of section 20. Area 20b forms the flow inlet side of plenum chamber 30 as more fully referred to above.

Referring now to FIGURE 6, a cross-sectional view of flowmeter 10 is shown, the cross-section being along the axis of symmetry 18 of the flowmeter. Recess 12 of housing 11 contains distributor 14 and jet support 15 in place therein, these components being clamped by means of O-rings 32 and 33 and retainer 16. Well 35 in the body of distributor 14 is adjacent flow inlet channel 38 of housing 11. Face 22 of distributor 14 is held against recess face 31 of housing 11. Face 23 of distributor 14 abuts inner face 26 of jet support 15. Wheel chamber 41 is formed by a recess in jet support 15, chamber 41 being bounded between recess face 43 within jet support 15 and face 23 of distributor 14. Plenum chamber 30 is formed by contiguous clearances 20b and 25b of distributor 14 and jet support 15 respectively.

Concavity 48 is cut into the face 23 of distributor 14 to facilitate the exit of fluid from wheel chamber 41 as described below. A cross-section of wheel 17 is shown positioned in wheel chamber 41. In operation, a spacing exists between the outer diameter 17c of wheel 17 and wheel chamber periphery 42, and a spacing also exists between radial face 17a of wheel 17 and distributor face 23 as well as between radial face 17b of wheel 17 and wheel chamber face 43.

Terminals 46a and 47a from readout sensors 46 and 47 respectively are shown projecting from face 27 of jet support 15 these terminals 46a and 47a being brought through the body of jet support 15. Sensors 46 and 47 function in conjunction with wheel 17, which conveniently has a pattern of conductive material deposited thereon (not shown). As wheel 17 rotates, the pattern of conductive material changes with respect to the sensors 46 and 47, and more particularly, with respect to the area between sensors 46 and 47. The electrical path between sensors 46 and 47 comprises the fluid passing through the flowmeter and the conductive material deposited on wheel 17. Thereby, the electrical resistance between sensors 46 and 47 changes at a rate which is a function of wheel rotational speed.

The components of flowmeter 10 may be composed of any suitable materials, such as metals or plastics. Conveniently, housing 11 and retainer 16 may be made of metal, while the distributor 14, and jet support 15 may be made of machinable plastic. Wheel 17 may be made of a material such as plastic, conveniently having a density roughly the same as the fluid to be monitored. In general, the nearer to the wheel density is to that of the fluid being measured, the lower the minimum wheel-suspending flow rate. When wheel 17 has approximately the same density as the monitored fluid, wheel 17 tends to achieve an operating position at the lowest possible flow rate.

When jet support 15 is made of an insulating material, the connection of readout sensors 46 and 47 with their terminals 46a and 47a respectively is simplified, the electrical conductors being set directly into the material with a pressure-tight relationship therewith. Similarly, alternate means of readout may be conveniently inserted through the insulating material of jet support 15 to terminate at inner face 26 and thus probe wheel chamber 41.

The mechanical configuration of flowmeter 10 having been detailed, the flow passage of fluid through flowmeter 10 may be described, referring to FIGURES 1, 2 and 6. In operation, flowmeter 10 is inserted in series with the flow line to be monitored, with the incoming flow connected to flow inlet 36 of housing 11 by suitable means, such as by a conventional threaded type connection. The out-going flow is connected from flow outlet 44 of jet support 15 by a suitable connection, such as by the threaded type connections shown.

The flow path is from flow inlet 36 through flow inlet channel 38 to distributor well 35, and from thence through the plurality of flow channels 21 to the cylindrically-shaped plenum chamber 30. The provision of plenum chamber 30 permits an equal pressure to be distributed to the entrance of each jet 45 cut through the section 25 of jet support 15. From plenum chamber 30 the flow is through each jet 45 into wheel chamber 41, emerging therein from each jet 45 an angle with the chamber radius. If each jet 45 has the same length and effective cross-section the pressure drop across each jet 45 will be similar and fluid velocity through each jet 45 will be the same, so that fluid entering wheel chamber 41 will be injected with approximately the same velocity and mass flow through each jet 45. Fluid injected through jets 45 is impelled in with a spiral motion through wheel chamber 41 towards flow outlet 44 of wheel chamber 41. The spiral motion may be more or less than a full 360° revolution about the wheel chamber 41 axis 18, according to flowmeter configuration and flow rate. Outlet 44 is positioned concentrically with the center line axis 18 through flowmeter 10. Illustratively, in the embodiment shown in FIGURES 1 through 6, there is a single flow outlet 44 provided concentrically centered along axis 18 through wheel chamber 41. Other configurations of a single flow outlet or multiple flow outlets are possible, so long as the flow pattern through wheel chamber 41 is a generally radial one, all the flow through chamber 41 progressing along a path from cylindrical periphery 42 radially inwards towards the center line axis 18. As shown in FIGURE 6, a single flow outlet 44 opens through faces 43 of wheel chamber 41. A modification would be the addition of a second flow outlet opening centrally through face 22 of distributor 14 and suitably ducted therefrom to join with the flow outlet 39 of flowmeter 10. Other possible modifications include an arrangement of multiple flow outlets through either or both wheel chamber faces arranged about axis 18 and not necessarily centered thereon, so long as these multiple outlets are radially inwards of the body of wheel 17. Thereby, all the fluid must progress radially past wheel 17 which follows a line through wheel chamber 41.

A discussion of the effects of fluid flow through flowmeter 10 is detailed below with reference to the cross-sectional views of wheel chamber 41 in FIGURES 7 and 8. The fluid enters through jets 45 into wheel chamber 41, proceeding radially inwards in a spiral flow path from cylindrical periphery 42 of wheel chamber 41 in the general direction of wheel chamber flow outlet 44. In this radially inward progression through wheel chamber 41, the fluid must cross the body of wheel 17. While flowmeter 10 is operating over the range of flow rates for which it is adapted, wheel 17 is suspended by the forces of fluid flow through wheel chamber 41 with a fixed attitude, and free from contact with the walls of wheel chamber 41. When wheel 17 is so suspended the fluid divides into two parts, the first part passing between face 23 of distributor 14 and wheel face 17a while the second part passes between wheel face 17b and face 43 of wheel chamber 41. These two parts of the radially progressing fluid flow, after passing faces 17a and 17b of wheel 17, again combine in the general area 49 radially inwards of the body of wheel 17, and the combined fluid passes from this area 49 through wheel chamber outlet 44 and through flow channel 40 to flow outlet 39 of wheel meter 10.

At a time prior to the start-up of a fluid flow through flowmeter 10, wheel 17 will be in physical contact with some portion of the walls of wheel chamber 41. If the density of wheel 17 is greater than that of the fluid surrounding it, wheel 17 will sink gravitationally downwards and wheel 17 will contact that portion of wheel chamber 41 underneath wheel 17 according to the orientation of flowmeter 10. Wheel 17 may have one of its faces 17a or 17b normal to its axis of rotation in contact with distributor face 23 or wheel chamber face 43, as the case may be; and wheel 17 may have its outside diameter surface 17c in contact with that portion of cylindrical periphery 42 of wheel chamber 41 beneath it. On the other hand, if the density of wheel 17 is less than that of the fluid the wheel will float to touch the portions of wheel chamber 41 above it. When the flow through flowmeter 10 is initially started, fluid passes through whatever spacing is at that time formed by the location of wheel 17 within wheel chamber 41. At least one spacing between a face of wheel 17 normal to its axis of rotation and the wheel chamber face adjacent thereto will allow the fluid to flow therethrough radially inwards along a curved path towards the center of wheel chamber 41. This flow of fluid through a spacing between wheel 17 and the walls of wheel chamber 41 generates forces tending to move wheel 17 toward the middle of wheel chamber 41. In general, the fluid pressure in regions of moving fluid are less than fluid pressures in regions of relatively stagnant fluid; thereby fluid pressures are higher in regions of wheel 17 contact with portions of the walls of wheel chamber 41. The tendency resulting from higher fluid pressures in stagnant areas is to push wheel 17 away from its contact with wheel chamber 41.

When the flow of fluid through wheel chamber 41 reaches a particular rate, the forces acting on the wheel are sufficient to cause wheel 17 to move away from touching any portion of wheel chamber 41, and wheel 17 will then be free to rotate in response to the tangential component of flow in the spiral flow. A detailed discussion of the effects of fluid flow upon a planar surface, with reference to calculation of the drag produced, may be found in Boundary Layer Theory by Herman Schlichting, 4th edition, McGraw-Hill, 1960, Library of Congress 59–15472, pages 25 etc. The particular flow rate at which this occurs depends in part upon the relative densities of wheel and the fluid in wheel chamber 41; in general, the more closely the respective densities are to one another, the smaller the flow rate required to move wheel 17 clear from contact with the wall of the wheel chamber 41. As the flow rate increases, the forces generated thereby also increase and wheel 17 is more closely moved to the center of wheel chamber 41. The attitude of wheel 17 is off-center from the middle of wheel chamber 41 by an amount necessary to provide sufficient unbalance in the respective fluid pressures on opposite portions of wheel 17 to counter the effects of the relative densities of wheel 17 and the fluid, that is to say, to counter the tendency of wheel 17 to float or sink.

It is apparent that forces generated by the fluid flow relative to wheel 17 and the walls of wheel chamber 41 exhibit balancing pressures in all directions on the rotating wheel, thereby maintaining wheel 17 with a fixed attitude while it is rotating in response to the tangential component of the spiral flow of the fluid in its progression from the periphery 42 to the central region 49 of wheel chamber 41. With respect to the stabilization of the axis of rotation of wheel 17 on center line axis 18 to flowmeter 10, a combination of forces presumably function to maintain this stabilization. The orientation of jets 45 tends to circulate the flow of fluid about the cylindrical periphery 42 of wheel chamber 41, thereby imparting rotation to wheel 17. If the outside diameter of rotating wheel 17 should happen to be too near a portion of periphery 42 of wheel chamber 41, it is likely that the static pressure at this point would tend to be higher than at other places on the periphery 42 of wheel chamber 41. This effect would tend to separate wheel 17 from the portion of periphery 42, restoring the axis of rotating wheel 17 towards the middle of wheel chamber 41. In addition, the approach of the outside diameter of wheel 17 near the opening of a jet 45 results in an increased blocking of that jet flow and a consequent increase in pressure therefrom so that wheel 17 tends to be pushed away from that jet. This tendency reduces as wheel 17 approaches the middle of chamber 42 in that the pressure of all jets 45 balance out to a null effect upon wheel 17 when it is so centered. In combination with these functions, the rotation of wheel 17 in response to the tangential components of flow tends to stabilize the axis of rotation of wheel 17 substantially on the centerline of chamber 42.

With respect to the suspension of wheel 17 in a plane normal to its axis of rotation, should face 17a approach closely its proximate wheel chamber face 23, flow therebetween is relatively restricted and it is assumed a larger proportion of the available pressure drop through the wheel chamber is concentrated across the relatively restricted spacing between face 17a and chamber face 23. Owing to viscous effects, it is likely that fluid flow through this restricted spacing is small, notwithstanding the higher pressure drop across this spacing. The spacing between wheel face 17b and chamber face 43 under these circumstances is relatively unrestricted and it is assumed that a larger flow of fluid passes therethrough. In addition, it is likely that fluid velocity through the larger spacing is higher, partly because of the lower viscous drag effects in the larger spacing, and partly because the fluid velocity entering the larger spacing is probably higher than the relatively stagnant fluid velocity at the opening of the relatively restricted spacing. Thus, though the pressure drop across the larger spacing may be somewhat smaller than the pressure drop across the smaller spacing, the fluid velocity through the larger spacing is a relatively higher velocity.

It is supposed that a static pressure measurement at each radial point on the face 17b of wheel 17 defining the larger spacing would be less than the measurement on the corresponding opposite point of face 17a of wheel 17, so that the totality of pressure on face 17a tends to enlarge the relatively restricted spacing at the expense of the relatively unrestricted spacing on the opposite face of the wheel. In this manner, the forces in the relatively unrestricted passage tend to balance the position of wheel 17 so that forces in the opposing passages are equalized allowing for differentials necessary to compensate for the relative density of the wheel and its suspending fluid.

Among the forces restraining wheel 17 in a plane normal to its axis of rotation may be mentioned shear forces developed by fluid issuing from jets 45 and forced to go to the side of wheel 17 which happens to be separated from the chamber wall in its initial rest position. The diversion of the fluid flow to one side causes it to flow axially along the outside diameter of wheel 17. The wheel is presumably dragged by this flow towards the center plane of chamber 41 normal to the axis of rotation until the forces introduced by flow starting across the newly-separated face of wheel 17 differentially cancel and are effectually nulled. A detailed discussion of the effects of fluid flow upon a planar surface, with reference to calculation of the drag produced, may be found in Boundary Layer Theory by Herman Schlichting, 4th edition, McGraw-Hill, 1960, Library of Congress 59–15472, pages 25, etc. It seems that this force aids the pressure forces developed by flow across the faces of wheel 17, so that wheel suspension may be effected at a relatively low flow rate and be enhanced as the flow rate increases.

It is apparent from experimentation that the stabilization of the axis of rotation of wheel 17 on the centerline of chamber 41 may be enhanced by making the diameters of concavity 48 and the concavity of wheel chamber flow outlet 44 both coincident with the inside diameter of wheel 17. This general arrangement effectively varies the length of the flow paths radially across the faces of wheel 17 according to the off-centered position of the axis of rotation of wheel 17. Only when the axis of rotation is centered are all radial paths across the faces of wheel 17 the same length about the circumference of wheel 17.

Movement of the wheel 17 axis off-center moves the inside diameter of wheel 17 in the direction of off-centering. This makes the inside diameter of wheel 17 overlap the diameter of concavities 48 and 44 in the region of wheel 17 opposite the direction of its off-centered axis. As a result, the flow paths across the faces of wheel 17 in this region opposite the off-centered direction are shorter than the flow paths across the remainder of the wheel faces. Apparently the reduced constriction of the flow paths in this region acts to produce forces restoring the axis of wheel 17 to the center of chamber 41 where the inside diameter of wheel 17 coincides with the diameters of concavity 48 and concavity 44.

In operation, according to the design configuration of wheel 17 and wheel chamber 41, various stabilization attitudes may be determined, and in some cases it is possible that there may be more than one radial plane attitude for wheel 17 as has been shown by experiment. However, a stabilized attitude of wheel 17 may readily be achieved so as to keep it from any mechanical contact with wheel chamber 41 surfaces while it is in operation. Further, the forces tending to center wheel 17 within wheel chamber 41 increase with increases in the flow rate.

It has been found that it may be useful to employ some means for recovering the pressure drop occurring in wheel chamber 41. Any such recovery of pressure drop reduces the total pressure drop presented by flowmeter 10 to the flow of fluid therethrough. Any means suitable to convert kinetic energy to potential energy may be employed such as the use of guiding vanes or bunched tubes, not shown, parallel with desired flow stream lines in the region between wheel chamber 41 and outlet 39 of flowmeter 10. Vanes, not shown may be extended from the central region 49 of wheel chamber 41 and may be at an angle to most effectively convert the kinetic energy created by the spiral flow back into potential energy.

Referring now to FIGURE 9, a three-dimensional view of a flowmeter adapted for the measurement of gaseous fluid flow is shown with a quarter section cut away. Gas flowmeter 50 has a configuration modified to provide a fluid suspension of its rotating member employing gas as the fluid medium.

The housing of flowmeter 50 is formed from inlet end piece 51, central cylindrically-shaped shell 52, and outlet end piece 53. Members 51, 52, and 53 are assembled together to form a housing for flowmeter 50 having provisions for containing the operable flowmeter components.

An inlet flow line is connected to threaded inlet 57 in end piece 51, and the gaseous flow is conducted therefrom through channels 58a and 58b to annular plenum chamber 55 which is inwardly concentric with central shell 52. From plenum chamber 55 the gaseous medium is conducted through multiple apertures 59 in chamber separator 54 into wheel chamber 66. Apertures 59 open into wheel chamber 66 at an angle such that gaseous flow thereto is imparted a tangential component with respect to the circumference of wheel chamber 66. Illustratively, five apertures 59 are aligned in a row extending across the depth of wheel chamber 66. Any number of such rows of five apertures 59 may be provided; illustratively four such rows may be conveniently employed.

The gas flows from apertures 59 through the space between the inner periphery of wheel chamber 66 and the inwardly concentric periphery of wheel 56, thereby imparting to wheel 56 a tendency to rotate. The gas flows from this space towards and around wheel axial faces 56a and 56b and recombines in an area inwardly of wheel 56 and is conducted therefrom through flow outlet channel 67 to flow outlet 68.

Referring to FIGURE 10, the readout means illustrated for flowmeter 50 employs a source of illumination 63 positioned in translucent member 60 centrally of wheel 56. Source 63 is masked by opaque member 61 having an aperture 62 therein in alignment with readout port 65 in shell 52. Chamber separator 54 is made of a translucent material. Member 52 is similarly translucent so that light may progress from source 63 through member 60 aperture 62 in member 61 wheel 56, chamber separator 54, and the portion of member 52 at the end of port 65. Wheel 56 is composed on a translucent material and has deposited thereon opaque portions 69 which are positioned periodically to intercept the light beam between aperture 62 and readout port 65 according to the rotation of wheel 56. Thus, light from element 63 appearing at readout port 65 is interrupted by opaque portions 69 at a frequency proportional to the speed of wheel 56.

In the illustrated embodiment of FIGURES 9 and 10, the extended surface area of wheel 56 provides in conjunction with the gaseous flow, an increased area for the radial suspension of wheel 56. The flowmeter 50 is adapted to be operated with its axis of symmetry in a horizontal position for optimum gaseous suspension provided by the particular configuration of wheel 56 in conjunction with wheel chamber 66. The wheel and wheel chamber configuration of FIGURES 9 and 10 may be altered so that the gas flowmeter may be mounted in any position. This may be accomplished by providing an effectively enlarged area in the radial plane for wheel 56. This may be done by removing the central light fixture assembly 60–63 and employing a wheel having enlarged faces such as may be obtained by providing at least one continuous member normal to the axis of rotation of wheel 56. Wheel 56 may be cylindrical with its plane ends 56a and 56b continuous, or a radial fin may be incorporated with wheel 56.

In general, considerations applicable to the previously discussed embodiments of the invention are applicable to the gas flowmeter, the difference being the increased area of the rotating member to more readily effect a gaseous fluid suspension.

Various readout means may be employed with the flowmeters described above, including means for detecting variations in resistance, capacity, or light reflecting characteristics. A convenient way for measuring the rotation of a flowmeter wheel is to deposit materials thereon having differing degrees of reflectivity, and employing a fiber optic sending and receiving stalk to illuminate and sense the fluctuations arising from wheel rotation. Another convenient means for readout would be to employ a rotating wheel having sections of differing materials so that rotation thereof affects an active element of a sensitive tuned circuit, thereby frequency modulating the output thereof according to the speed of rotation of the rotating member.

Referring now to FIGURE 11, a quarter-section view of flowmeter embodiment 70 is shown in which rotating wheel 71 is illustrated in its entirety. Wheel 71 is also shown in FIGURE 12 for a more clear reference to its various surfaces. This embodiment employs a radial flow of fluid through the wheel chamber with the rotating member adapted to be impelled by the radial movement rather than any tangential component of flow.

Flowmeter 70 has a housing comprised of shell 72, flow inlet end piece 73, and flow outlet end piece 74. These components 72, 73 and 74 are clamped together by suitable means such as bolts 75, and are provided with seals to provide a pressure-tight mating of the components. The portions of end pieces 73 and 74 facing each other within the interior of flowmeter 70 are so configured to form the opposing surfaces of wheel chamber 76, annular plenum chamber 77 and annular passage 78. Wheel chamber 76 is inwardly concentric with plenum chamber 77, with concentric annular passage 78 providing connections therebetween.

A source of fluid to be measured is connected to flow inlet 79 by suitable means such as by use of tapped threads 80. The fluid flows from inlet 79 through flow inlet conduit 81, thence branching out from distribution well 82 into a plurality of flow distribution channels 83 which communicate from respective openings 84 into plenum chamber 77. Plenum chamber 77 tends to equalize the pressure of fluid throughout its circumference.

The fluid flows from plenum chamber 77 through annular flow passage 78 into the peripheral area of cylindrically-shaped wheel chamber 76. Thereby, the fluid enters wheel chamber 76 substantially uniformly about its circular periphery. From the circular periphery of wheel chamber 76, the fluid flow tends to pass radially inwards towards the chamber flow outlet at the axial center 85 of wheel chamber 76. This radially inwards passage of fluid is deflected by vanes 86 on wheel 71. Vanes 86 are positioned so as to present an angle to the radial flow through wheel chamber 76, thereby providing means for torquing wheel 71 about its axis of rotation. The fluid flow tends to divide around the body of wheel 71 and the two divided parts cross faces 87a and 87b of wheel 71. Upon reaching open center 88 of wheel 71 the fluid recombines and exits through flow outlet channel 89 to flow outlet 90 which is connected by suitable means to the fluid system.

The configurations of wheel 71 and wheel chamber 76 are adapted to contribute to the development of a fluid suspension of wheel 71 therein so that wheel 71 may rotate free from contact with the inner surfaces of wheel chamber 76. In this embodiment the flow through wheel chamber 76 does not exhibit a spiral configuration, inasmuch as passage 78 from plenum chamber 77 into wheel chamber 76 is adapted to impart no appreciable angular velocity to the fluid flow. Thus the fluid stream lines tend to flow radially inwards from the circular periphery of wheel chamber 76 towards axial center 85 of wheel chamber 76. The stream lines are somewhat deflected by vanes 86 of wheel 71, and torque derived from this deflection provides the rotational force for wheel 71.

In this embodiment the minimum operating spaces between wheel 71 and proximate respective portions of wheel chamber 76 are defined principally by the outer faces 91 and 92 of vanes 86 as well as by the circular periphery 93 of wheel 71. The passage of fluid with respect to faces 91 and 92 of vanes 86, as well as with respect to circular periphery 93 of wheel 71 provides fluid forces contributing to fluid suspension of wheel 71 free mechanical contact with wheel chamber 76 while wheel 71 is rotating.

Access port 94 is a bore extending from the outer surface of outer end piece 74 into wheel chamber 76, reaching a position in the walls of wheel chamber 76 that vanes 86 of wheel 71 pass in succession with the rotation of wheel 71. Access port 94 may have inserted therein in a pressure-tight relationship therewith a fiber-optic stalk which illuminates the reflective faces 91 of vanes 86 and also returns the variation in reflected light therefrom caused by wheel rotation. The frequency of the reflected light signal is directly representative of the speed of rotation of wheel 71, thus providing the flowmeter readout signal.

Alternatively, passage 78 may be fitted with fixed deflecting vanes, not shown, to impart a tangential component of flow to the fluid entering wheel chamber 71. It may be assumed that if these deflecting vanes are positioned according to principles of bladed turbines, added torque may be imparted to the vanes 86 of wheel 71. Different flowmeter characteristics may be produced thereby, such as a lower minimum flow rate to achieve suspension of wheel 71.

Referring to FIGURE 13, a schematic cross-section of a flowmeter is shown in which the axis of rotation of the rotating measuring member is stabilized according to the principles of the invention, while the movement of the measuring member in a direction normal to the plane of rotation is determined by the flow rate of the measured fluid.

Flowmeter 100 has a flow inlet 101 opening into a distribution chamber 102. The fluid flows from distribution chamber 102 through a plurality of flow passages 103 upwardly and at an angle into the bottom of metering chamber 104. Flow passages 103 are angularly disposed so that they inject fluid through flow passage outlets 105 into the bottom of metering chamber 104 at an angle that imparts a rotating movement to the fluid entering meter chamber 104. The rotating fluid flows from flow passage outlets 105 upwardly around and past the body of a rotatable measuring member 106, and continuing upwardly passes through metering chamber 104 and out through flow outlet 107 of flowmeter 100.

In the quiescent condition, of flowmeter 100, measuring member 106 rests on the flow passage outlets 105 of flow passages 103, thereby effectively blocking them. Any appreciable flow from outlets 105 will push the body of measuring member 106 upwardly and away from outlets 105, thereby allowing the fluid to pass around the body of measuring member 106 and upwardly therefrom. This action may be likened to fluid acting on a piston, in which the fluid entering at one side of the piston tends to displace the piston away from the effective entering point primarily according to the volume of the entered fluid. It may be presumed that an extremely low flow rate would be sufficient to move measuring member 106 up from physical contact with the bottom of metering chamber 104. The displacement of measuring member 106 upwardly is in a large degree dependent upon the flow rate of the fluid through flowmeter 100. This displacement may be also affected by design of rotatable member 106, such as by tapering it and the walls of metering chamber 104 adjacent thereto. Rotatable member 106 may be constrained with a more fixed attitude by design incorporating Bernoulli principles so that a relatively fixed spacing is obtained between the bottom of rotatable member 106 and outlets 105 over a large range of flow rates.

The spiral circulating flow of the fluid through measuring chamber 104 will rotate measuring member 106 about its axis of rotation while it is lifted from the bottom of measuring chamber 104. The speed of rotation of measuring member 106 will be a function of the flow rate of the circulating flow.

The axis of rotation of measuring member 106 will tend to center in measuring chamber 104 so that the body of measuring member 106 does not contact the sides of chamber 104. The forces tending to stabilize the axis of rotation of measuring member 106 are analogous to the forces which stabilize the axis of rotation of rotatable members in the several described embodiments.

What is claimed is:
1. A bearingless rotary flowmeter comprising:
a housing having a chamber,
means for directing a fluid through said chamber with at least a radial component of flow therethrough with respect to the central region of said chamber, with said means for directing including inlet means to said chamber radially displaced from outlet means from said chamber,
a rotatable member located within said chamber responsive to the flow of said fluid through said chamber wherein said member is acted upon by said fluid as that the axis of rotation of said rotatable member tends to be positioned centrally with respect to said chamber entirely by the action of said fluid and wherein said rotatable member in response to said flow of said fluid through said chamber derives a tendency to be rotated about said axis of rotation whereby the axis of rotation of said member is maintained centrally in said chamber while fluid is flowing therethrough without the need for any mechanical bearing support for said axis of rotation, and
means for providing a basis for detection of the rotations of said rotatable member.

2. A bearingless rotary flowmeter utilizing forces derived from a fluid directed with at least a radial component of flow through a chamber therein to provide a tendency to position the axis of rotation of a rotatable member to a central place in said chamber entirely by the action of said fluid and with said member being rotatably responsive to the flow of said fluid directed through said chamber whereby the axis of rotation of said member is maintained centrally in said chamber while fluid is flowing therethrough without the need for any mechanical bearing support for said axis of rotation, and means for providing a basis for detection of the rotations of said rotatable member.

3. The flowmeter of claim 1 wherein said fluid directed through said chamber additionally tends to position the central plane of rotation of said rotatable member to a central place within said chamber thereby allowing rotation of said member free from contact with the walls of said chamber.

4. The flowmeter of claim 1 wherein said fluid directed through said chamber generally progresses radially inwards from the chamber walls towards the interior of said chamber and with all said fluid progressing through said chamber having at least a radial component of flow with respect to the center of said chamber.

5. The flowmeter of claim 1 wherein said means for directing injects said fluid into said chamber generally in the plane of rotation of said rotatable member.

6. The flowmeter of claim 2 wherein said forces provide a fluid suspension of said rotatable member substantially centered on a point within said chamber over the operating range of said flowmeter.

7. The flowmeter of claim 1 wherein there is a general conformity between the shape of said member and the shape of said chamber with provision for a general spacing therebetween.

8. The flowmeter of claim 2 wherein said forces are exerted generally between surfaces of said rotatable member and surfaces of said chamber proximate thereto.

9. The flowmeer of claim 1 wherein said fluid is guided through said chamber with both radial and tangential components of flow with respect to the axis of rotation of said member wherein rotation tends to be imparted to said member by said tangential component of flow.

10. The flowmeter of claim 1 wherein all said fluid flowing through said chamber has substantially a radial direction of flow with respect to the axis of rotation of said member with means affixed to said member for imparting rotation thereto in response to said radial flow.

11. The flowmeter of claim 1 wherein the effects of the relative densities of said rotatable member and the fluid surrounding it are compensated by said rotatable member being positioned sufficiently off-center with respect to the middle of said chamber as a consequence of said effects so that all forces including gravity acting upon said rotatable member balance thereby providing a stable position of said member.

12. The flowmeter of claim 1 wherein the surfaces of said rotatable member and the corresponding surfaces of the walls of said chamber have sufficient areas to provide for fluid positioning of said member by gaseous flows.

13. The flowmeter of claim 7 wherein said chamber has an enlarged portion the boundary thereof being substantially in line with a boundary of said member so that displacement of the axis of rotation of said member results in an intrusion of said member into said enlarged portion of said chamber.

14. A bearingless rotary flowmeter comprising:
a housing having means for directing a fluid through a chamber therein with said means including inlet means to said chamber radially displaced from outlet means from said chamber with said fluid having a substantial radial component of flow with respect to the axial center of said chamber,
a member in said chamber being rotatable in response to the flow of fluid through said chamber and said member being adapted to provide a general spacing between said member and the surfaces of said chamber with said spacing adapted for fluid therein to promote the only constraint of the position of the axis of rotation of said member whereby the flow of fluid through said chamber tends to constrain the position of the axis of rotation of said member centrally within said chamber entirely by the action of said flow of fluid and tends to rotate said member at a speed that is a function of the flow rate of said fluid, and
means responsive to the rotation of said member having an output signal related to said rotation thereby indicating the flow rate of said fluid.

15. The flowmeter of claim 14 wherein said fluid directed through said chamber additionally tends to position the central plane of rotation of said rotatable member to a central place within said chamber thereby allowing rotation of said member free from contact with the walls of said chamber.

16. A flowmeter comprising:
a housing having a chamber therein with a generally circular radial plane section with respect to an axial center thereof,
means for directing a flow of fluid through said chamber with all said fluid having at least a substantial radial component of flow with respect to said axial center thereof so that all said fluid progresses in generally radial directions through said chamber with all the components of said flow tending to be symmetrically distributed about said axial center of said chamber,
a rotatable member in said chamber having means responsive to said flow of fluid for imparting rotation thereto and having a generally circular radial plane section adapted for positioning within said chamber concentrically on said axial center of said chamber with provision for a general spacing between the surfaces of said member and the proximate surfaces of said chamber with said spacing adapted for fluid therein to promote a substantial balance of radial forces around the circular periphery of said rotatable member with the resultant net force on said rotatable member normal to its axis of rotation being substantially zero and said spacing adapted for fluid therein to promote a substantial balance of axial forces upon opposite points on said member throughout said radial plane of said member with the resultant net force on said rotatable member normal to said radial plane being substantially zero, whereby said flow of fluid through said chamber tends to position the axis of rotation of said rotatable member approximately on said axial center of said chamber and tends to position the radial center plane of said rotatable member substantially parallel to the radial center plane of said chamber thereby providing a fluid suspension of said member with said member free from the direct contact with said surfaces of said chamber at fluid flow rates through said chamber higher than a rate sufficient to overcome the effects of the relative specific gravities of said member and said fluid with said member being rotated in response to said flow of fluid at a speed related to the fluid flow rate through said chamber, and means responsive to the rotation of said member for producing an output signal related to said fluid flow rate.

17. The flowmeter of claim 16 wherein the radial center plane of said rotatable member tends to be positioned approximately on the radial center plane of said chamber.

18. The flowmeter of claim 14 wherein the effects of the relative densities of said rotatable member and the fluid surrounding it are compensated by said rotatable member being positioned sufficiently off-center with respect to the middle of said chamber as a consequence of said effects so that all forces including gravity acting upon said rotatable member balance thereby providing a stable position of said member.

19. The flowmeter of claim 16 wherein said rotatable member is rotated in response to said flow of fluid at a speed approximately proportional to the flow rate of said fluid through said chamber over the operating range of said flowmeter and including means responsive to the rotation of said member for producing an output signal related to the flow rate of said flow of fluid.

20. A bearingless rotary flowmeter comprising:
a housing having means for fluid to flow through a chamber therein with said means including inlet means to said chamber radially displaced from outlet means from said chamber with all of said fluid having a substantial radial component of flow with respect to an axial center of said chamber and all of said flow characterized by a spiral movement through said chamber with respect to said axial center, a member in said chamber rotatable in response to said flow through said chamber with said member being adapted to provide a general spacing between said member and the surfaces of said chamber so that the flow of fluid therein promotes the sole constraint of the position of the axis of rotation of said member wherein the flow of fluid through said chamber tends to position the axis of rotation of said member centrally with respect to said chamber entirely by the action of said flow of fluid whereby the axis of rotation of said member is maintained centrally in said chamber while fluid is flowing therethrough without the need for any mechanical bearing support for said axis of rotation, and means responsive to the rotation of said member having an output signal related to the speed of rotation of said member.

21. The flowmeter of claim 20 wherein said fluid flowing through said chamber promotes positioning of the central plane of rotation of said rotatable members to a central place within said chamber.

22. A flowmeter comprising:

a housing having a chamber therein with a generally circular section and with at least one flow inlet opening into said chamber at an angle with the radius of said chamber intersecting said inlet, an outlet radially displaced from said inlet, whereby a tangential component of flow is imparted to a fluid progressing from said inlet to said outlet thus characterizing said flow by a spiral movement through said chamber, a rotatable member in said chamber adapted for positioning free from direct contact with the surfaces of said chamber and providing spacing for said fluid to flow around the body of said member, means for said fluid to recombine after radially passing said body in order to leave said chamber through said outlet whereby said flow exerts forces upon said member tending to suspend said member free from contact with the walls of said chamber while said member is rotated in response to said tangential component of flow, and means for detecting the frequency of rotation of said rotatable member for providing an indication of the flow rate of said fluid passing through said chamber.

23. A flowmeter comprising:
a housing having a generally cylindrical chamber therein with at least one flow inlet opening through the circular periphery of said chamber at an angle with a radius of said chamber intersecting the opening of said flow inlet and said chamber having a flow outlet at a location radially inwards of said circular periphery so that flow through said chamber is characterized by a spiral movement from the peripheral region towards the axial center of said cylinrical chamber, a rotatable member located within said chamber having a shape with a generally circular outer limit adapted for positioning concentrically inwards of said circular periphery of said chamber with spacing provided therebetween and said member having opposed surfaces with respect to the radial plane of said member adapted to form a passage with each respectively adjacent surface of said chamber so that said spiral movement flowing in said passages tends to divide between each said passage thereby moving relative to said opposed surfaces of said member producing forces thereon tending to suspend said member in the radial plane of said cylindrical chamber free from said surfaces of said chamber proximate said faces, means for recombining said flow passing through said passages to permit all said flow to leave through said flow outlet whereby said flow tends to rotate said member about its axis of rotation while suspending said member at a substantially fixed attitude approximately in the middle of said cylindrical chamber, and means responsive to the speed of rotation of said member having an output signal substantially proportional to said speed of rotation over the operating range of said flowmeter thereby indicating the flow rate of said fluid through said chamber.

24. The flowmeter of claim 23 wherein all of said fluid flowing through said chamber has a substantial radial component of flow.

25. The flowmeter of claim 23 wherein a plurality of inlets to said chamber are symmetrically disposed on the circumference of said cylindrical chamber with each inlet having a similar angle with respect to a radius of said chamber that the opening thereof intersects.

26. A bearingless rotary flowmeter comprising:
a housing having means to direct a fluid radially through a chamber therein with respect to an axial center of said chamber,
with said means for to direct including inlet means to said chamber radially displaced from outlet means from said chamber, a rotatable member in said chamber having means responsive to the radial flow of said fluid through said chamber for imparting rotation to said member and said member being adapted to provide a general spacing between said member and the surfaces of said chamber with said spacing adapted for fluid passing therein to provide the entire suspension of said member whereby the flow of fluid through said chamber tends to position the axis of rotation of said member centrally within said chamber entirely by the action of said flow of fluid and imparts rotation of said member as a function of the flow rate of said fluid whereby the axis of rotation of said member is maintained centrally in said chamber while fluid is flowing therethrough without the need for any mechanical bearing support for said axis of rotation, and means responsive to the rotation of said member having an output signifying said flow rate of said fluid.

27. The flowmeter of claim 26 with vanes on said rotatable member for imparting rotation thereto in response to said radial flow through said chamber.

28. The flowmeter of claim 26 wherein said spacing is adapted for fluid passing therein to promote a substantial balance of radial forces around the general periphery of said rotatable member with respect to its plane of rotation with the resultant net force on said rotatable member normal to its axis of rotation being substantially zero and said spacing being adapted for fluid passing therein to promote a substantial balance of axial forces upon opposite points on the surfaces of said rotatable member throughout its radial plane with the resultant net force on said rotatable member normal to said radial plane being substantially zero whereby the flow of fluid through said chamber tends to position the axis of rotation of said rotatable member approximately on said axial center of said chamber and tends to position the radial center plane of said rotatable member approximately on the radial center plane of said member thereby providing a fluid suspension of said member with said member free from direct contact with said surfaces of said chamber higher than a certain minimum rate while said rotatable member is rotated at a speed substantially proportional to the fluid flow through said chamber by said means responsive to the radial fluid flow for imparting rotation.

29. The flowmeter of claim 26 wherein all said fluid passing through said chamber flows in a substantially radial direction therethrough.

30. Flowmeter apparatus comprising a housing:

a rotor in said housing and adapted to be rotated about a central rotor axis, said rotor having opposite sides which are spaced axially; flow directing means supported in position adjacent and radially beyond the periphery of said rotor, said flow directing means including means to direct the fluid being measured with at least a radial component inwards against said rotor periphery in a direction to cause the fluid to divide and pass along both sides of said rotor towards respective regions adjacent the axis of said rotor; said housing including wall means positioned along both sides of said rotor to confine said fluid flow therealong and to develop pressure variations on said rotor sides tending to maintain said rotor in an equilibrium position with respect to axial movement; conduit means to conduct the fluid from said axial regions to the output of the meter; and means for detecting the speed of rotation of said rotor for providing an indication of flow rate.

31. Apparatus as claimed in claim 30, including means to direct said fluid along said rotor sides in a generally spiral fashion causing rotation of said rotor proportional to fluid flow rate.

32. The flowmeter of claim 20 with said rotating member suspended entirely on said fluid suspension provided by said forces thereby eliminating mechanical supports.

33. For use with a bearingless rotary flowmeter having a fluid inlet and a fluid outlet radially displaced from one another and including a rotor which is rotated about a central axis thereof by said fluid so that the flow rate can be determined by sensing the rotational speed of said rotor, the method of suspending said rotor in the fluid to eliminate frictional contact with structural elements of the meter comprising the steps of: directing the fluid from the fluid inlet inwardly against the peripheral surface of said rotor so that the fluid divides the flows with at least a radial component of motion along both sides of the rotor towards respective regions adjacent said central axis; confining said flow along the rotor sides to develop a pressure drop between the fluid at said peripheral surface and the fluid in said regions adjacent said central axis with the average pressure on said rotor sides being inversely related to the spacing between the respective rotor side and the corresponding confining means, whereby the rotor will automatically be held entirely by pressure forces at an equilibrium position with respect to axial movement; and conducting said fluid from said axial regions to the fluid outlet of the meter.

34. The flowmeter of claim 2 having the axis of rotation of said member stabilized approximately on the center of said chamber by said forces while said member is maintained otherwise free from contact with said chamber by the action of means specially adapted for otherwise positioning said member free from contact with said chamber so that the combination of the positioning of the axis of rotation with the specially adapted means for positioning produces a total freedom of contact of the surfaces of said member from the surface of said chamber.

References Cited

UNITED STATES PATENTS

| | | | |
|---|---|---|---|
| 2,052,794 | 9/1936 | Petot | 73—230 |
| 2,518,149 | 8/1950 | Kearsley. | |
| 3,240,060 | 3/1966 | Doyle. | |
| 2,678,624 | 5/1954 | Grise et al. | 116—117 |
| 2,847,969 | 8/1958 | Woodruff | 116—117 |
| 3,097,529 | 7/1963 | Jackson et al. | 73—231 |
| 3,121,330 | 2/1964 | Leslie et al. | 73—231 |
| 3,248,943 | 5/1966 | Francisco | 73—231 |

FOREIGN PATENTS

| | | |
|---|---|---|
| 637,474 | 2/1962 | Canada. |
| 1,259,771 | 3/1961 | France. |

RICHARD C. QUEISSER, *Primary Examiner.*

V. J. TOTH, *Assistant Examiner.*

U.S. Cl. X.R.

73—253